US008813656B1

(12) United States Patent  
Hazzard et al.

(10) Patent No.: US 8,813,656 B1
(45) Date of Patent: Aug. 26, 2014

(54) MULTI-CONFIGURABLE TV STAND WITH TOP SURFACE JOINED VERTICAL STRUCTURE

(71) Applicant: Whalen Furniture Manufacturing Inc., San Diego, CA (US)

(72) Inventors: Thomas Barr Hazzard, Ladera Ranch, CA (US); Tracy Leigh Hazzard, Ladera Ranch, CA (US)

(73) Assignee: LF Centennial Limted, Road Town, Tortola (VG)

( * ) Notice: Subject to any disclaimer, the term of this patent is extended or adjusted under 35 U.S.C. 154(b) by 0 days.

(21) Appl. No.: 13/934,450

(22) Filed: Jul. 3, 2013

Related U.S. Application Data

(60) Provisional application No. 61/680,714, filed on Aug. 8, 2012.

(51) Int. Cl.
*A47B 23/00* (2006.01)
*A47B 81/06* (2006.01)

(52) U.S. Cl.
CPC .............. *A47B 81/06* (2013.01); *Y10S 248/923* (2013.01)
USPC ....... 108/42; 108/50.01; 108/50.11; 248/923; 248/125.8

(58) Field of Classification Search
CPC ........ A47B 96/00; A47B 81/06; A47B 23/04; F16M 11/00; H04N 5/63
USPC ........ 108/42, 50.01, 50.02, 50.11, 10, 23, 91, 108/92, 96; 312/223.6, 223.1, 223.3, 7.2; 248/923, 125.8, 150, 176.1, 917, 149, 248/127, 146; 211/90.2, 187, 186
See application file for complete search history.

(56) References Cited

U.S. PATENT DOCUMENTS

| 366,525 | A | 7/1887 | Taliaferro |
| 368,388 | A | 8/1887 | Drake |
| 866,522 | A | 9/1907 | Scanlon |
| 1,324,537 | A | 12/1919 | Belcher |
| 1,398,601 | A | 11/1921 | Osterhout |
| 1,590,726 | A | 6/1926 | Corsgren |
| 1,598,569 | A | 8/1926 | Fitzhugh |
| 1,692,337 | A | 11/1928 | Forbes |
| 1,797,847 | A | 3/1931 | Vandagriff |
| 2,193,647 | A | 3/1940 | Rush |
| 2,359,895 | A | 10/1944 | Burton |
| D141,593 | S | 6/1945 | Doty |

(Continued)

FOREIGN PATENT DOCUMENTS

| JP | 2006060754 | 3/2006 |
| WO | 2009143771 | 3/2009 |

*Primary Examiner* — Jose V Chen
(74) *Attorney, Agent, or Firm* — Barlow, Josephs & Holmes, Ltd.

(57) ABSTRACT

A flat panel television console and support kit allows the consumer to employ any of three modes of support, namely stand mount, console mount, and wall mount. The console assembly has upper and lower shelves, and a vertical column is secured to the console at a joint. A base plate can be fastened to the upper shelf of the console so that a flange on the base plate extends upwardly to support a vertical column that supports a TV mounting frame over the console. Alternatively, when the consumer wishes to mount the TV on the wall or on the console, the base plate can be fastened to the upper shelf in an inverted position so that the upper surface of the upper shelf is substantially flat.

7 Claims, 5 Drawing Sheets

(56) References Cited

U.S. PATENT DOCUMENTS

| | | | | |
|---|---|---|---|---|
| 2,535,112 | A | 12/1950 | Woody | |
| 2,605,155 | A | 7/1952 | Lewis | |
| 3,232,249 | A | 2/1966 | Perez | |
| 3,358,957 | A | 12/1967 | Lindenmuth | |
| 3,875,356 | A | 4/1975 | Heim et al. | |
| 3,905,573 | A | 9/1975 | Davis | |
| 4,020,510 | A | 5/1977 | Fabian | |
| 4,076,203 | A | 2/1978 | McDonnell | |
| 4,272,136 | A | 6/1981 | Sengua | |
| 4,410,158 | A | 10/1983 | Maffei | |
| 4,444,323 | A | 4/1984 | Travis | |
| 4,993,676 | A | 2/1991 | Fitts | |
| 5,139,223 | A | 8/1992 | Sedighzadeh | |
| 5,207,405 | A | 5/1993 | Cobb | |
| 5,282,427 | A | 2/1994 | Steinhilber | |
| 5,549,264 | A | 8/1996 | West | |
| 6,158,701 | A | 12/2000 | Deshler | |
| 6,288,891 | B1 | 9/2001 | Hasegawa | |
| 6,327,982 | B1 | 12/2001 | Jackson | |
| 6,347,433 | B1 | 2/2002 | Novin | |
| D454,731 | S | 3/2002 | Niitsu | |
| D458,053 | S | 6/2002 | Luong | |
| 6,425,631 | B1 | 7/2002 | Lin | |
| 6,609,691 | B2 | 8/2003 | Oddsen | |
| D480,237 | S | 10/2003 | deCarolis | |
| 6,672,465 | B2 | 1/2004 | White | |
| 6,695,270 | B1 | 2/2004 | Smed | |
| 6,699,146 | B1 | 3/2004 | Winter | |
| 6,704,193 | B2 | 3/2004 | Vathulya | |
| 6,758,454 | B2 | 7/2004 | Smed | |
| D495,163 | S | 8/2004 | Weatherly | |
| 6,796,536 | B1 | 9/2004 | Sevier | |
| 6,905,101 | B1 | 6/2005 | Dittmer | |
| D507,900 | S | 8/2005 | Sexton, III | |
| D508,801 | S | 8/2005 | Holst | |
| 6,923,413 | B2 | 8/2005 | Dozier | |
| D517,349 | S | 3/2006 | Lara | |
| D524,080 | S | 7/2006 | Stenhouse et al. | |
| 7,082,882 | B2 | 8/2006 | Heimbrock | |
| 7,118,080 | B2 | 10/2006 | Chan | |
| D531,428 | S | 11/2006 | Choo | |
| 7,175,146 | B2 | 2/2007 | Kim | |
| 7,178,775 | B2 | 2/2007 | Pfister | |
| D537,658 | S | 3/2007 | Tung | |
| D539,125 | S | 3/2007 | Ly Hau | |
| 7,195,213 | B2 | 3/2007 | Weatherly | |
| D539,565 | S | 4/2007 | Sexton, III | |
| D541,138 | S | 4/2007 | Whalen | |
| 7,261,261 | B2 | 8/2007 | Ligertwood | |
| D564,261 | S | 3/2008 | Sculler | |
| D565,054 | S | 3/2008 | Anderson | |
| D566,426 | S | 4/2008 | Stenhouse | |
| D567,546 | S | 4/2008 | Liu | |
| D570,620 | S | 6/2008 | Ongor | |
| D574,698 | S | 8/2008 | Grey | |
| 7,530,538 | B2 | 5/2009 | Whalen | |
| D595,978 | S | 7/2009 | Portnoy | |
| D604,962 | S | 12/2009 | Daud | |
| D607,671 | S | 1/2010 | Sexton, III | |
| 8,167,253 | B2 * | 5/2012 | Smith | 248/125.3 |
| 8,191,485 | B1 * | 6/2012 | Whalen et al. | 108/42 |
| 8,523,299 | B2 * | 9/2013 | Smith | 312/7.2 |
| 8,622,005 | B1 * | 1/2014 | Whalen et al. | 108/42 |
| 2002/0011544 | A1 | 1/2002 | Bosson | |
| 2004/0011932 | A1 | 1/2004 | Duff | |
| 2004/0041062 | A1 | 3/2004 | Ozolins et al. | |
| 2004/0079849 | A1 | 4/2004 | Rudolf | |
| 2004/0079858 | A1 | 4/2004 | Rudolf | |
| 2004/0084578 | A1 | 5/2004 | Cho | |
| 2004/0084579 | A1 | 5/2004 | Lee | |
| 2004/0113031 | A1 | 6/2004 | Sung | |
| 2004/0118984 | A1 | 6/2004 | Kim | |
| 2004/0188573 | A1 | 9/2004 | Weatherly | |
| 2004/0188574 | A1 | 9/2004 | Weatherly | |
| 2004/0211870 | A1 | 10/2004 | Bremmon | |
| 2004/0256524 | A1 | 12/2004 | Beck | |
| 2005/0041379 | A1 | 2/2005 | Jang | |
| 2005/0045782 | A1 | 3/2005 | Lee | |
| 2005/0167549 | A1 | 8/2005 | Ligertwood | |
| 2005/0236530 | A1 | 10/2005 | Weatherly | |
| 2007/0246629 | A1 | 10/2007 | Saxton | |
| 2007/0252919 | A1 | 11/2007 | McGreevy | |
| 2008/0156949 | A1 | 7/2008 | Sculler | |
| 2009/0039212 | A1 | 2/2009 | Whalen | |
| 2011/0043978 | A1 | 2/2011 | Bremmon | |
| 2011/0079688 | A1 | 4/2011 | Grove | |

* cited by examiner

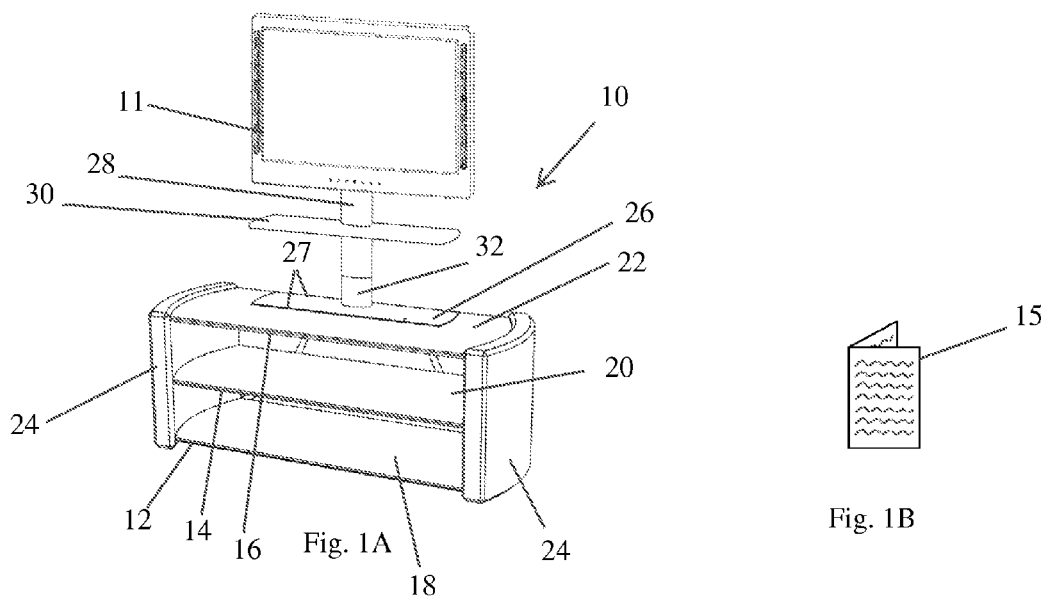
Fig. 1A
Fig. 1B
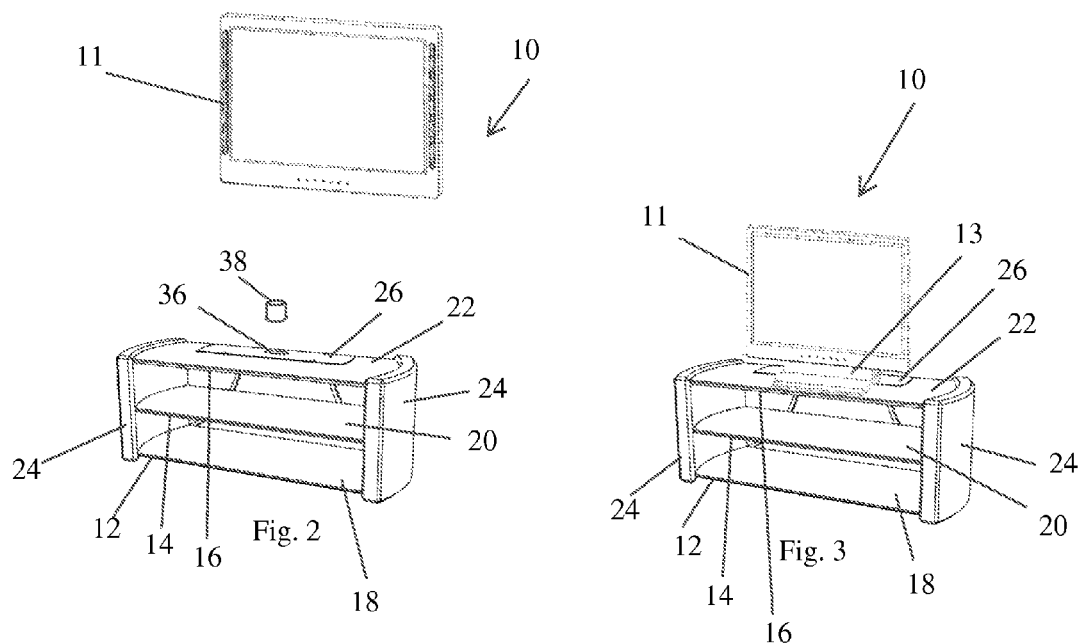
Fig. 2
Fig. 3

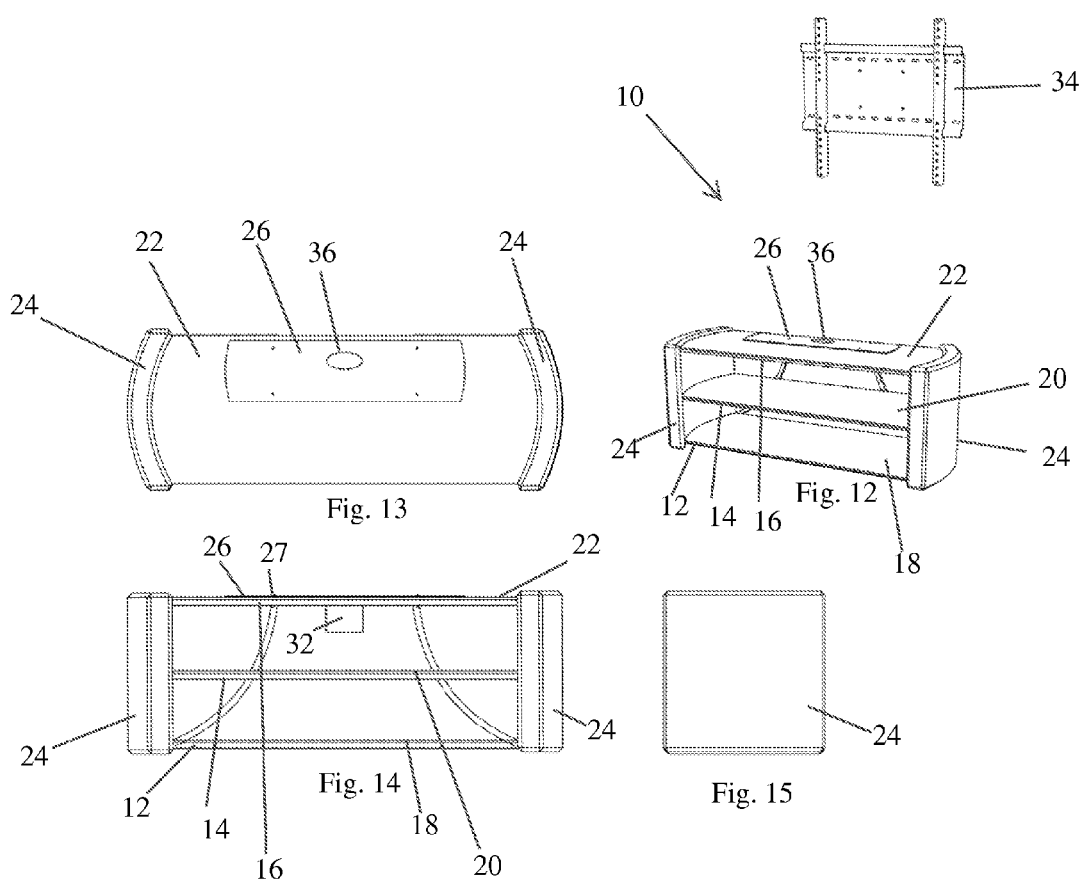

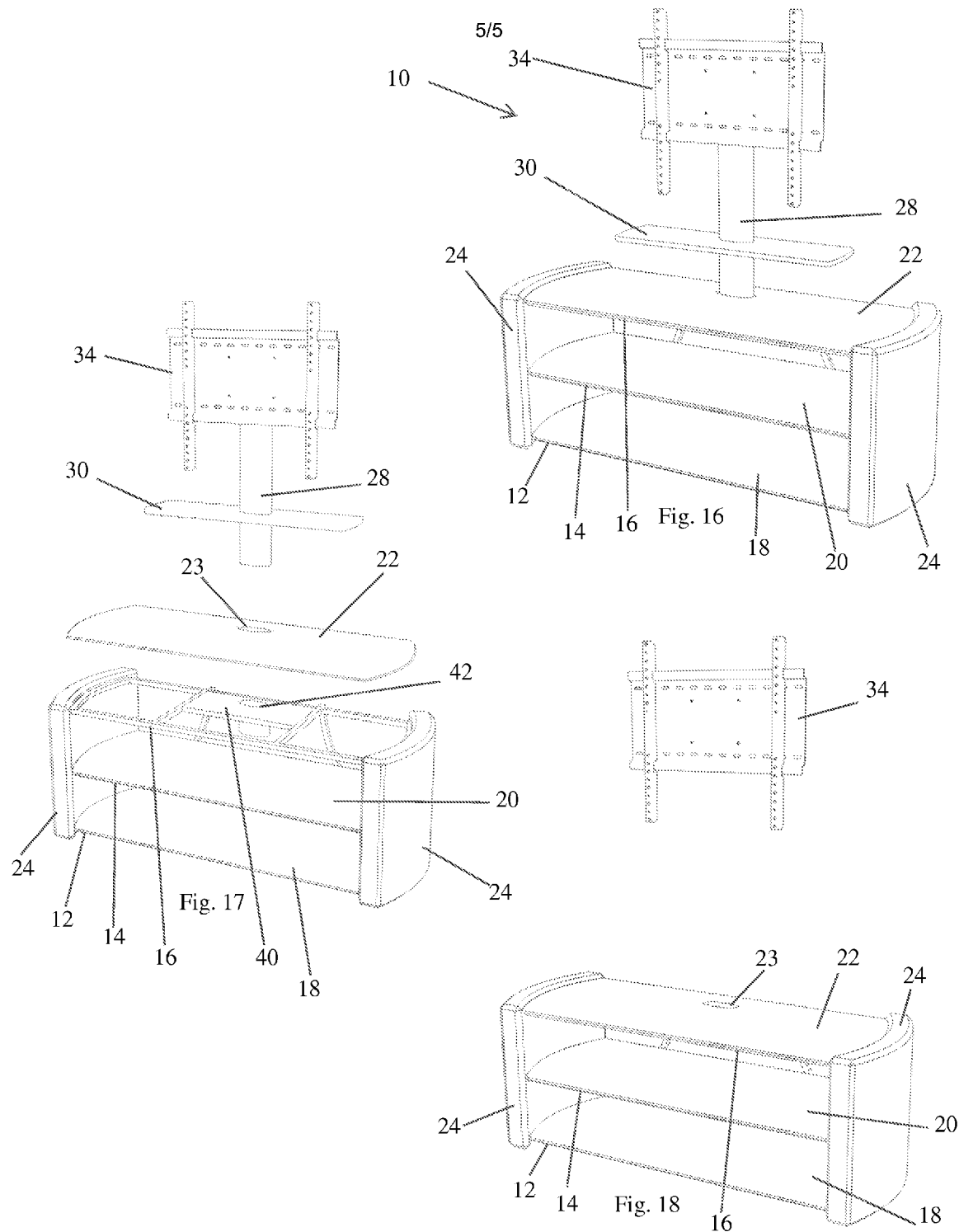

MULTI-CONFIGURABLE TV STAND WITH TOP SURFACE JOINED VERTICAL STRUCTURE

CROSS REFERENCE TO RELATED APPLICATION

This application is related to and claims priority to earlier filed U.S. provisional patent application 61/680,714, filed Aug. 8, 2012, the entire contents of which is incorporated herein by reference.

BACKGROUND AND SUMMARY OF THE INVENTION

The instant invention relates to the field of mounting systems for televisions to be wall-mounted or carried on a base (console).

The instant invention provides a flat panel television console and support kit for supporting a television in a plurality of different user assembled configurations. The kit incorporates components for a flat panel television console assembly with multiple shelves carried on horizontally extending shelf supports.

The manufacturer delivers to the consumer an unassembled kit that includes assembly instructions that instruct the consumer to assemble the console by engaging the shelves with the shelf supports and connecting the shelf supports to a pair of legs for structural support. When the shelves and legs are assembled, a flat panel television (purchased separately) can be supported on an upper surface of the upper shelf.

The kit is customizable to suit consumer preferences. The kit includes additional features that may be selectively arranged and connected, depending on the desired configuration. The kit includes a base plate having a top surface, a bottom surface, and a flange extending upwardly from the top surface. The kit also includes a vertical column that is detachably securable to the flange at a joint so that the vertical column extends upwardly from the console assembly when the flange extends upwardly from the console assembly. The consumer can mount a flat panel television on a flat panel television mounting frame that is included in the kit, and the consumer can then secure the frame to either a wall or the vertical column. The kit also includes a cap structure that can be optionally received in an aperture defined on the base plate when the vertical column is not received in the flange and the base plate is inverted.

To facilitate customization of the console assembly by the consumer, the kit includes assembly instructions for various embodiments. Assembly instructions direct a consumer to assemble the kit in a first configuration in which the consumer secures a flat panel television to a flat panel television mounting frame, and then secures the mounting frame to the vertical column. The base plate is secured to the upper shelf so that the flange extends upwardly from the console, and the vertical column is secured to the flange at a joint.

The assembly instructions further direct a consumer to assemble the kit in a second possible configuration in which the flat panel television is secured to the mounting frame and the mounting frame is secured to a wall. The console is positioned beneath the flat panel television, and can be used to support accessory components for the flat panel television. The base plate is inverted so that the flange extends through an aperture on the upper surface of the upper shelf.

The assembly instructions still further direct a consumer to assemble the kit in a third possible configuration in which the flat panel television is supported by a television stand that is supported on an upper surface of the upper shelf on the console. In this configuration, the consumer inverts the base plate so that the flange extends through an aperture on the upper surface of the upper shelf. In this configuration, the base plate provides a substantially flat surface on the upper shelf of the console.

The kit may include a sound bar or sensor shelf that is detachably secured to the vertical column and extend horizontally from the vertical column. The sound bar/sensor shelf may be secured to the vertical column at various vertical positions.

The joint at which the vertical column is secured to the base plate may be fixed or may allow the vertical column to rotate with respect to the base plate. When the joint is rotatable, the user may rotate the mounting frame with respect to the base plate, depending on the desired viewing angle.

Accordingly, among the objects of the instant invention are: the provision of a console assembly, a base plate, a vertical column, and a mounting frame that can be constructed and arranged with an aesthetically matched design to form an aesthetically matched set of kit components. It is further an object of the present invention to provide advantages for the consumer and the retailer. For the retailer, stocking the kit avoids having to stock multiple disparate kits, which would create a customer service burden, to help the consumer select the right kit, and restocking costs when kits are returned. For the consumer, the kit satisfies the mounting requirements for virtually any TV that the consumer might initially use it with, and to TVs that the consumer may acquire in the future. The console may be assembled and used alone with a conventional CRT TV, or with a panel TV mounted on its own stand (base). Later when the consumer acquires a Vesa standard LCD TV, for example, the consumer can attach the base plate to the upper shelf, secure the mounting frame to the vertical column, secure the vertical column to the base plate, and suspend the panel TV above the console by securing it to the mounting frame. Should the consumer later acquire a still larger TV, or prefer wall mounting, the mounting frame can again be used. The kit incorporates multi-purposed components to reduce the parts count. All components can be broken down to lie flat for shipping and storage in the minimum space. The kit provides for a floating appearance of the panel above the console and this visual effect is enhanced by being able to hide the wires and cables within the support.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated of carrying out the present invention:

FIG. 1A is a perspective view of the flat panel television console and support kit of the present invention assembled in a first configuration;

FIG. 1B is a perspective view of assembly instructions;

FIG. 2 is a perspective view of the kit in a second configuration;

FIG. 3 is a perspective view of the kit in a third configuration;

FIG. 12 is a perspective view of the kit in a second configuration without a television mounted on the mounting frame;

FIG. 13 is a top view thereof;

FIG. 14 is a front view thereof;

FIG. 15 is a right view thereof;

FIG. 16 is a perspective view of a second embodiment of the flat panel television console and support kit of the present invention assembled in a first configuration;

FIG. 17 is an exploded view thereof; and

FIG. 18 is a perspective view of the second embodiment of the present invention in a second configuration.

DESCRIPTION OF THE PREFERRED EMBODIMENT

Figure 5:
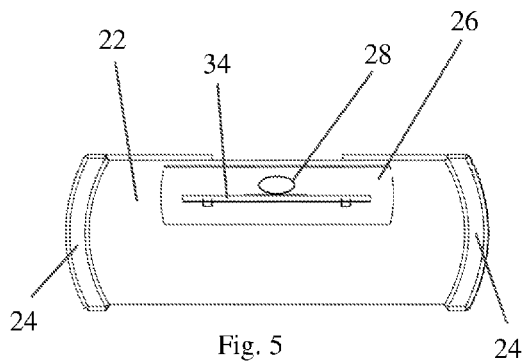
FIG. 5 is a top view thereof.
Figure 4:
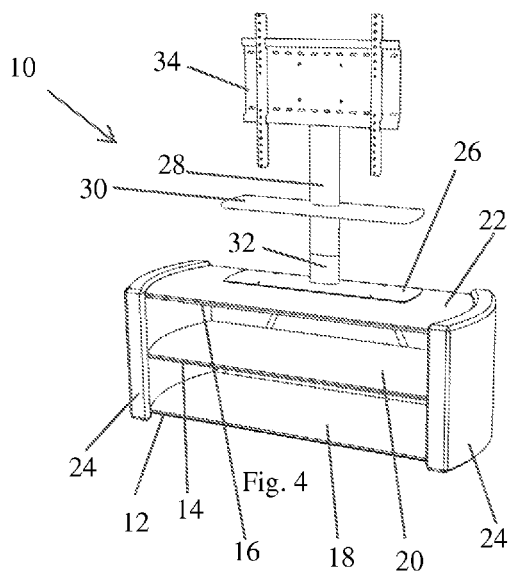
FIG. 4 is a perspective view of the kit in a first configuration without a television mounted on the mounting frame.
Figure 6:
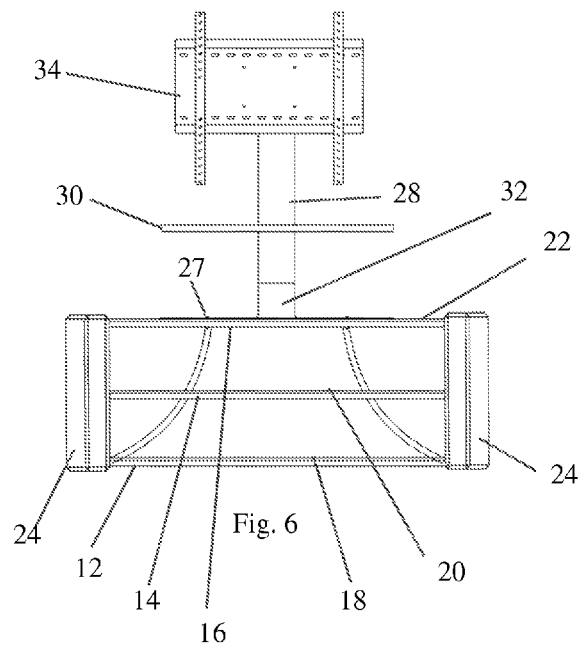
FIG. 6 is a front view thereof.
Figure 7:
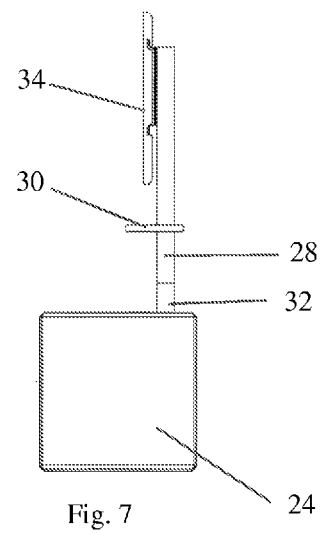
FIG. 7 is a right view thereof.
Figure 9:
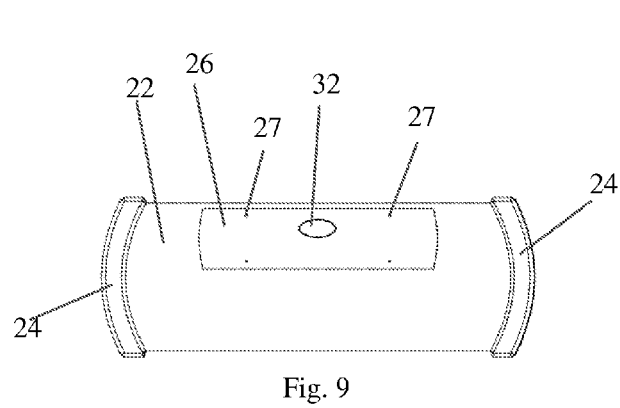
FIG. 9 is a top view thereof.
Figure 8:
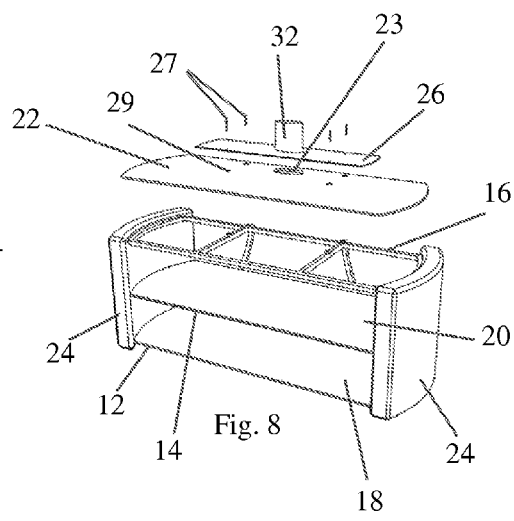
FIG. 8 is an exploded perspective view of the console without the vertical column.
Figure 10:
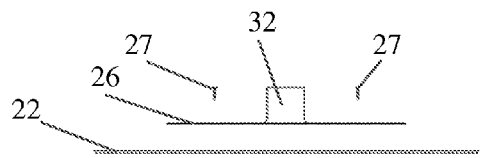
FIG. 10 is a front view thereof.
Figure 10:
Figure 10:
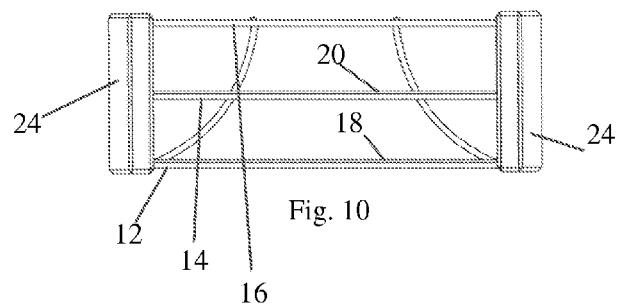
Figure 11:
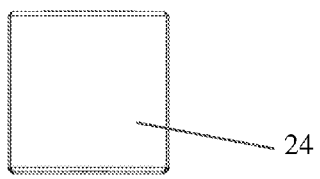
FIG. 11 is a right view thereof.

Referring now to the drawings, the flat panel television (TV) console and support kit of the instant invention is illustrated and generally indicated at 10 in FIGS. 1A-18. As will hereinafter be more fully described, the instant invention provides a multi-configurable television stand with a vertical column and a base plate that is usable in various configurations and selected by the consumer.

The manufacturer provides a set of aesthetically matched kit components that can be assembled in an aesthetically matched design in at least three configurations. FIGS. 1A, 2, and 3 show various configurations from which a consumer can choose when assembling the flat panel television console and support kit provided by the manufacturer. FIG. 1B shows a printed set of assembly instructions 15 that instruct the user to assemble the kit in the various configurations. In each configuration, the television (TV) 11 is mounted in a viewable position either on or above the console 10, which can be used to support TV accessories (not shown—sold separately). Consumers can select from these configurations according to their preferences and the physical dimensions of the space in which they place the assembled console 10. The kit includes all of the parts required for the various configurations, and a consumer may convert the console from one configuration to another by incorporating or removing kit components, according to the assembly instructions, as discussed below.

Each of the configurations in FIGS. 1A, 2, and 3 includes a console 10 for supporting accessory components and possibly a flat panel television 11 (sold separately), depending on the configuration. The console assembly includes lower, middle, and upper horizontally extending shelf supports 12, 14, 16 supported between a pair of legs 24. Lower, middle, and upper shelves 18, 20, 22 are supported on the lower, middle, and upper shelf supports, 12, 14, 16, respectively. The console can support a flat panel television 11 on the upper surface of the upper shelf 22. The console may include more or fewer legs or shelf supports and shelves without departing from the scope of the present invention.

The kit also includes a television mounting frame 34 to which a flat panel television 11 may be secured. The mounting frame 34 may be secured to the wall or to the console assembly 10, depending on the desired configuration of the kit components, as discussed in more detail below.

For supporting the mounting frame in one configuration, the kit includes a vertical column 28. The vertical column 28 can be secured to the console 10 by joining the lower end of the column 28 to a flange 32 on a base plate 26 that is secured to the console 10, as described below.

The consumer may detachably secure a sound bar/sensor shelf 30 to the vertical column 28 at various positions. FIG. 1A shows one position in which the sound bar/sensor shelf 30 may be placed. Other positions may be selected according to user preferences.

To enable the consumer to assemble each of the configurations, the kit includes printed assembly instructions 15, shown in FIG. 1B. The assembly instructions 15 direct a consumer to assemble the kit in a first configuration shown in FIG. 1A. In this configuration, the consumer secures the shelf supports 12, 14, 16 to the legs, and places shelves 18, 20, 22 on the shelf supports. The instructions 15 direct the consumer to secure the base plate 26 to the upper surface of the upper shelf 22 so that the flange 32 on the base plate 26 extends upwardly from the upper shelf 22. Then the consumer secures the vertical column 28 to the console 10 by attaching the lower end of the vertical column 28 to the flange 32. A flat panel television mounting frame 34 is then secured to the vertical column 28, and a flat panel television 11 is secured to the mounting frame 34. A sound bar/sensor shelf 30 may be secured to the vertical column 28.

The assembly instructions 15 also direct a user to assemble the kit in a second configuration, as shown in FIG. 2, in which the flat panel TV 11 is secured to the mounting frame 34, which is secured to a wall in the room. This configuration does not use the vertical column 28. The consumer inverts the base plate 26 so that the flange 32 is received in an aperture 23 on the upper shelf 22, so that the upper surface of the console 10 is substantially flat. The console 10 is positioned beneath the mounting frame 34 so that the TV 11 is secured above the console 10. The console 10 can be used to support accessory components for the TV. In this embodiment, there is an aperture 36 defined on the lower surface of the base plate 26. When, as in the second configuration, the base plate 26 is inverted, the lower surface of the base plate 26 forms part of the upper surface of the console 10. The user may insert a cap 38 into the base plate aperture 36 so that the assembled components provide a continuous, substantially flat upper surface on the console 10. Alternatively, the cap may also include a pass through port (not shown) for receiving wires.

The assembly instructions 15 further direct a consumer to assemble the components in a third configuration, as shown in FIG. 3, in which the TV 11 is supported directly on the upper surface of the upper shelf 22 of the console 10. In this configuration, the mounting frame 34, and vertical column 28 are omitted. As in the second configuration, a cap is inserted in the aperture 36 on the base plate, providing a continuous upper surface on the upper shelf 22 of the console 10. The television 11 is supported by a TV stand 13, such as one typically purchased with a flat panel TV, which is not necessarily a part of the kit of the present invention.

The vertical column 28 is designed to be hollow and there is at least one opening in the vertical column 28, so that wires from the television 11 can run through the vertical column 28. Thus, the wires are hidden from view, increasing the aesthetic value of the console 10. This also allows the consumer to run cables within the column 28 and through the base plate aperture 36 to connect the television 11 to accessories or other input and output devices typically associated with a television.

FIGS. 4-7 provide various views of the kit assembled in the first configuration with the shelves 18, 20, 22 secured to the shelf supports 12, 14, 16 and without the television 11 mounted on the mounting frame 34.

FIGS. 8-11 show an exploded view of the console 10 in the first configuration, without the vertical column 28 or mounting frame 34. These figures show how the consumer may secure the upper shelf 22 to the upper shelf support 16 and secure the base plate 26 to the upper shelf 22 using fasteners, such as threaded fasteners 27. The base plate 26 is mounted on the upper shelf 22 so that the flange 32 extends upwardly from the upper shelf 22 of the console 10. A single set of fasteners 27 can extend through both the base plate 26 and the upper shelf 22 and thereby secure the base plate 26 to the upper shelf support 16. Other fastener arrangements can be used without departing from the scope of the present invention. When the upper shelf 22 and base plate 26 are secured to the upper shelf support 16, the vertical column 28 can be secured to the flange on the base plate 26, and the sound bar/sensor shelf 30 and mounting frame 34 can be secured to the vertical column 28 to form the console 10 of FIG. 4. The flat panel TV 11 can then be mounted to the mounting frame 34, to yield the configuration shown in FIG. 1A.

FIGS. 12-15 provide perspective, top, front, and right views of the kit in the second configuration. These figures show how the base plate 26 is inverted in the second configuration and forms a substantially flat upper surface on the upper shelf 22 of the console 10. In the second configuration, this upper shelf 22 is useful for supporting items such as TV accessory components. In the third configuration, this upper shelf 22 is useful for supporting a TV mounted on a TV stand.

FIGS. 16-18 show a second embodiment of the kit of the present invention. In this embodiment, the joint for the vertical column 28 is directly a part of the top shelf support 16 of the console 10. The upper shelf 22 has an aperture 23 through which the vertical column 28 may extend, as shown in FIG. 16. As shown in FIG. 17, the upper shelf support 16 includes a top surface support structure 40 and a joint 42 to attach the vertical column. When the vertical column 28 is not used, such as in the second configuration of the second embodiment, shown in FIG. 18, a cap (not shown) may be inserted into the hole in the upper shelf to form a substantially flat top surface on the console.

It can therefore be seen that the instant invention provides a console assembly, base plate with a flange, a vertical column, a cap structure, and a mounting frame that can be constructed and arranged with an aesthetically matched design to form an aesthetically matched set of kit components. The kit provides a single product that can be customized by a user according to user preferences and constraints. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A flat panel television console and support kit for use in a plurality of different user assembled configurations comprising:

a flat panel television console assembly including upper and lower horizontally extending shelf supports, and upper and lower shelves respectively carried on said upper and lower shelf supports, said flat panel television console assembly being capable of supporting a flat panel television on an upper surface of said upper shelf;

a base plate having a top surface, a bottom surface, and a flange extending upwardly from said top surface;

a vertical column capable of providing an elevated support for a flat panel television;

said vertical column being detachably securable to said flange at a joint so that said vertical column extends upwardly from said console assembly when said flange extends upwardly from said console assembly;

a sound bar/sensor shelf detachably secured to said vertical column and extending horizontally from said vertical column, said sound bar/sensor shelf being securable at a plurality of positions along the length of said vertical column;

a flat panel television mounting frame;

said kit being useful in a first configuration in which a base plate is fastened to said upper surface of said upper shelf so that said bottom surface of said base plate is in facing engagement with said upper surface of said upper shelf and said flange extends upwardly from said console, said flange receives said vertical column, thereby joining said vertical column to said console assembly, said flat panel television mounting frame is secured to said vertical column, and said flat panel television is secured to said flat panel television mounting frame;

said kit being useful in a second configuration in which a flat panel television is mounted to said flat panel television mounting frame and said flat panel television mounting frame is secured to a wall above said console assembly, said base plate is inverted so that said flange extends through an aperture on said upper surface of said upper shelf, and said base plate is fastened to said upper surface on said upper shelf, said base plate forming a substantially flat surface on said upper shelf;

said kit being useful in a third configuration in which said base plate is inverted so that said flange extends through said aperture on said upper surface of said upper shelf, said base plate is fastened to said upper surface on said upper shelf, said base plate forming a substantially flat surface on said upper shelf, and a flat panel television is supported on said upper shelf of said console.

2. The kit of claim 1 wherein said vertical column is hollow and has at least one opening for receiving wires.

3. The kit of claim 1 wherein said joint allows said vertical column to rotate with respect to said console assembly.

4. The kit of claim 1 wherein said joint is fixed to prevent rotation of said vertical column with respect to said console assembly.

5. The kit of claim 1 wherein said sound bar sensor shelf is attached to said vertical column above said flat panel television mounting frame.

6. The kit of claim 1 wherein said sound bar sensor shelf is attached to said vertical column below said flat panel television mounting frame.

7. The kit of claim 1 wherein a plurality of fasteners secure said base plate to said upper surface of said upper shelf.

* * * * *